United States Patent
Malladi

(10) Patent No.: US 8,958,474 B2
(45) Date of Patent: Feb. 17, 2015

(54) SYSTEM AND METHOD FOR EFFECTIVELY ENCODING AND DECODING A WIDE-AREA NETWORK BASED REMOTE PRESENTATION SESSION

(75) Inventor: Krishna Mohan Malladi, San Ramon, CA (US)

(73) Assignee: Virtualinx, Inc., San Ramon, CA (US)

( * ) Notice: Subject to any disclaimer, the term of this patent is extended or adjusted under 35 U.S.C. 154(b) by 470 days.

(21) Appl. No.: 13/421,019

(22) Filed: Mar. 15, 2012

(65) Prior Publication Data
US 2013/0243076 A1 Sep. 19, 2013

(51) Int. Cl.
H04N 19/186 (2014.01)

(52) U.S. Cl.
CPC ................... *H04N 19/186* (2013.01)
USPC ....... 375/240.08; 345/604; 382/166; 348/453

(58) Field of Classification Search
None
See application file for complete search history.

(56) References Cited

U.S. PATENT DOCUMENTS

| 6,603,883 | B1 * | 8/2003 | Hamanaka | 382/239 |
|---|---|---|---|---|
| 6,741,263 | B1 * | 5/2004 | Pether | 345/600 |
| 7,239,754 | B2 * | 7/2007 | Akimoto et al. | 382/240 |
| 7,460,725 | B2 | 12/2008 | Malladi et al. | |
| 7,657,118 | B2 * | 2/2010 | Aufranc et al. | 382/276 |
| 8,055,069 | B2 * | 11/2011 | Chiang et al. | 382/166 |
| 8,139,081 | B1 * | 3/2012 | Daniel | 345/600 |
| 2009/0310947 | A1 * | 12/2009 | Chillie | 386/131 |
| 2010/0020866 | A1 * | 1/2010 | Marpe et al. | 375/240.02 |
| 2012/0008679 | A1 * | 1/2012 | Bakke | 375/240.08 |

* cited by examiner

*Primary Examiner* — Willliam C Vaughn, Jr.
*Assistant Examiner* — Michael Bennett
(74) *Attorney, Agent, or Firm* — Plager Schack LLP

(57) ABSTRACT

A system and method for effectively encoding and decoding a wide-area network based remote presentation scheme makes use of a scalable video codec (SVC) to encode multiple screen data. A RGB frame of each screen is converted into YUV444 which is subsequently converted into two YUV420 frames. The V frame of the YUV444 is divided into four sub-frames. Two of those sub-frames are combined with the Y frame to create the first YUV420 frame. A second YUV420 frame is created by combining the remaining two V sub-frames with the U frame. The two YUV420 frames are encoded separately by using SVC or together by using Multi-View Codec. An SVC decoder receives and decodes two such YUV420 frames. Those decoded YUV420 frames are then used to obtain the YUV444 frame which is subsequently converted in to RGB frame to display the image on a screen.

15 Claims, 4 Drawing Sheets

SYSTEM AND METHOD FOR EFFECTIVELY ENCODING AND DECODING A WIDE-AREA NETWORK BASED REMOTE PRESENTATION SESSION

BACKGROUND OF THE INVENTION

The present invention relates to computer-based systems for enhancing collaboration between and among individuals who are separated by distance and/or time. Remote presentation is required for this distance collaboration. Ideally, the full range, level and intensity of interpersonal communication and information sharing will be provided with such remote presentation.

Screen capture and processing capabilities have recently been integrated into desktop and portable personal computers and workstations. While such systems are capable of processing, combining, and recording video and data locally networked collaborative environments are not adequately supported, principally due to the substantial bandwidth requirements and high latency for real-time transmission of high-quality, digitized audio and full-motion. Therefore, a number of sampling techniques are typically used when sending remote-presentation screen.

There are two main color spaces from which the majority of video formats are derived. The first color space is commonly referred to as the RGB (Red Green Blue) color space (hereinafter referred to as RGB). RGB is used in computer monitors, cameras, scanners, and the like. The RGB color space has a number of formats associated with it. Each format includes a value representative of the Red, Green, and Blue chrominance for each pixel. In one format, each value is an eight bit byte. Therefore, each pixel consumes 24 bits (8 bits (R)+8 bits (G)+8 bits (B)). In another format, each value is 10 bits. Therefore, each pixel consumes 30 bits.

Another color space widely used in television systems and is commonly referred to as the YCbCr color space or YUV color space (hereinafter referred to as YUV). In many respects, YUV provides superior video quality in comparison with RGB at a given bandwidth because YUV takes into consideration that the human eye is more sensitive to variations in the intensity of a pixel than in its color variation. As a result, the color difference signal can be sub-sampled to achieve bandwidth saving. Thus, the video formats associated with the YUV color space, each have a luminance value (Y) for each pixel and may share a color value (represented by U and V) between two or more pixels. The value of U (Cb) represents the blue chrominance difference between B-Y and the value of V (Cr) represents the red chrominance difference between R-Y. A value for the green chrominance may be derived from the Y, U, and V values. YUV color space has been used overwhelmingly in video coding field.

For convenience and keeping with conventional video techniques, the following discussion describes each block as representing one pixel. Therefore, hereinafter, the term pixel will be used interchangeably with the term block when referring to arrays depicted in any illustrations.

There are several YUV formats currently existing.

In the YUV444 format, each pixel is represented by a Y, U, and V value. The YUV444 format uses eight bits for the Y value, eight bits for the U value, and eight bits for the V value. Thus, each pixel is represented by twenty-four bits. Because this format consumes twenty-four bits for each pixel, other YUV formats are down-sampled from the YUV444 format so that the number of bits per pixel is reduced. The reduction in bits per pixel provides improvement in streaming efficiency. However, down-sampling results in a corresponding degradation in video quality.

For the YUV420 format only one pixel per 2×2 array of pixels is represented by twenty-four bits. The other pixels in 2×2 array are each represented by eight bits of Y value only. For example, using matrix notation, (1,1) would be represented by 8 bits each of the Y, U and V components while (1,2), (2,1) and (2,2) would each be represented only by 8 bits of Y component. Thus average number of bits per pixel in the YUV420 format is twelve bits. The YUV420 is a planar rather than packed format. Thus, the YUV420 data is stored in memory such that all of the Y data is stored first, then the U data, then all of the V data.

Based on the quality that is desired and the transmission bandwidths that are available, an electronic device manufacturer may design their electronic devices to operate with either of the YUV444 or YUV420 formats. However, when transmission bandwidths increase and/or consumers begin to demand higher quality video, the existing electronic devices will not support the higher quality video format. For example, currently many digital televisions, set-top boxes, and other devices are designed to operate with the YUV420 video format. In order to please the different categories of consumers, there is a need to accommodate both video formats.

The video codecs and picture codecs are being used to encode and decode the screen data for remote presentation sessions. The remote presentation sessions typically require high quality that can only be achieved by coding using YUV444 format without sub-sampling to other formats such as YUV420 or YUV422. The video codecs have some drawbacks such as high encoding latency and decoding supported typically limited to YUV420 formats. Though the picture codecs such as JPEG and JPEG2000 support low encoding latency and YUV444, they typically compress less as compared to video codecs. This limits them to local area networks as they cannot support low bandwidth requirements of wide area networks. Also, the current codecs used for the remote presentation session do not incorporate scaling techniques as applies to quality, temporal and spatial scalability to improve the overall system performance.

Because of bandwidth constraint of the wide area networks and low latency requirements of the remote display sessions, existing systems use compression systems that are less efficient. The existing systems use less efficient compression techniques as video codecs reduce the quality to meet with bandwidth constraints of wide area networks and increase the latency. Both conditions critically effect remote display sessions.

Due to growing demands of more efficient codecs, it is apparent that new techniques for remote presentation sessions are required to support YUV444 format with high compression and support for various scalability options. Therefore, for all the above reasons, developing a new technique for efficiently encoding and decoding is important for the remote presentation session applications.

SUMMARY OF THE INVENTION

In accordance with the present invention, a system and method for encoding and decoding screen data for remote presentation session is disclosed. The encoding system receives the source image from the screen data. This source image data is typically implemented as an array of digital picture elements (pixels) in a known RGB format. A color conversion module then converts a RGB frame in to YUV444 format. The frame in the YUV444 format is then converted in to two frames of YUV420 format as described below.

The YUV444 format contains three colors of the same resolution, i.e. each color having the same size of the array in two dimensions. One of the U or V color array is divided in to four sub-arrays of one quarter of the earlier array size. Two of such sub-arrays are combined with the Y color array to form the first YUV420 format frame. The remaining two other sub-arrays are combined with the undivided remaining color array to form the second YUV420 format frame. These two YUV420 format frames are encoded with any standard video encoder as follows.

The first frame is encoded using any standard video codec using the standard techniques including intra and inter predictions and scalability options such as quality, temporal and spatial scalabilities. The second frame is encoded using the same intra and inter predictions and scalability options to enhance the speed of encoding. The encoded data of both the frames are sent to the decoder with the markers to distinguish either as part of standard header of encoded bit-stream or as a part of header of the remote data presentation/remote presentation session (RDP) protocol.

The decoder receives the encoded frames from the RDP protocol and decodes them in to YUV420 format frames. Based on the markers present in RDP protocol or encoded frame data, the decoder then combines the first and second frames in to a single frame of YUV444 format as follows.

The chrominance data arrays in each of the YUV420 format frames are extracted and combined to produce a chrominance array with resolution same size as that of luminance component in each frame. The luminance component array in the first frame is stored as the same component of YUV444 format. The luminance component of the second frame is stored as the corresponding chrominance component of the YUV444 format. The reconstructed chrominance array from the above described process is then stored as the remaining chrominance component of the YUV444 format. The YUV444 format frame is then convert in to RGB format frame for display using color conversion process.

DETAILED DESCRIPTION OF THE INVENTION

One or more computers can be used for execution of methods of the embodiments of the invention.

Figure 1:
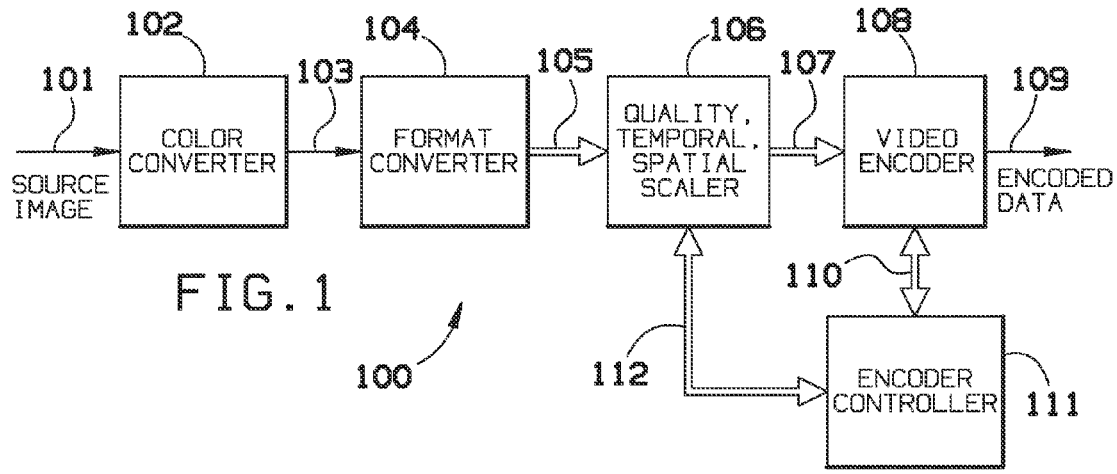
FIG. 1 is a block diagram of the encoder system of the present invention.

FIG. 1 depicts the general implementation of the invention on the server side which may be called as an encoder 100 to encode the captured screen data or the display data. The image captured from the screen or display 101 is generally in the RGB color space which is converted in to YUV444 color space using the color converter block 102 providing algorithms that are generally available as described above.

After converting the RGB input image in to YUV444 or YCbCr color space, the output 103 of 102 consists of 3 color component frames namely the Y component, the U component and the V component. As described above, in YUV444 all of these color components have the same resolution i.e., the number of pixels in each component.

Figure 2:
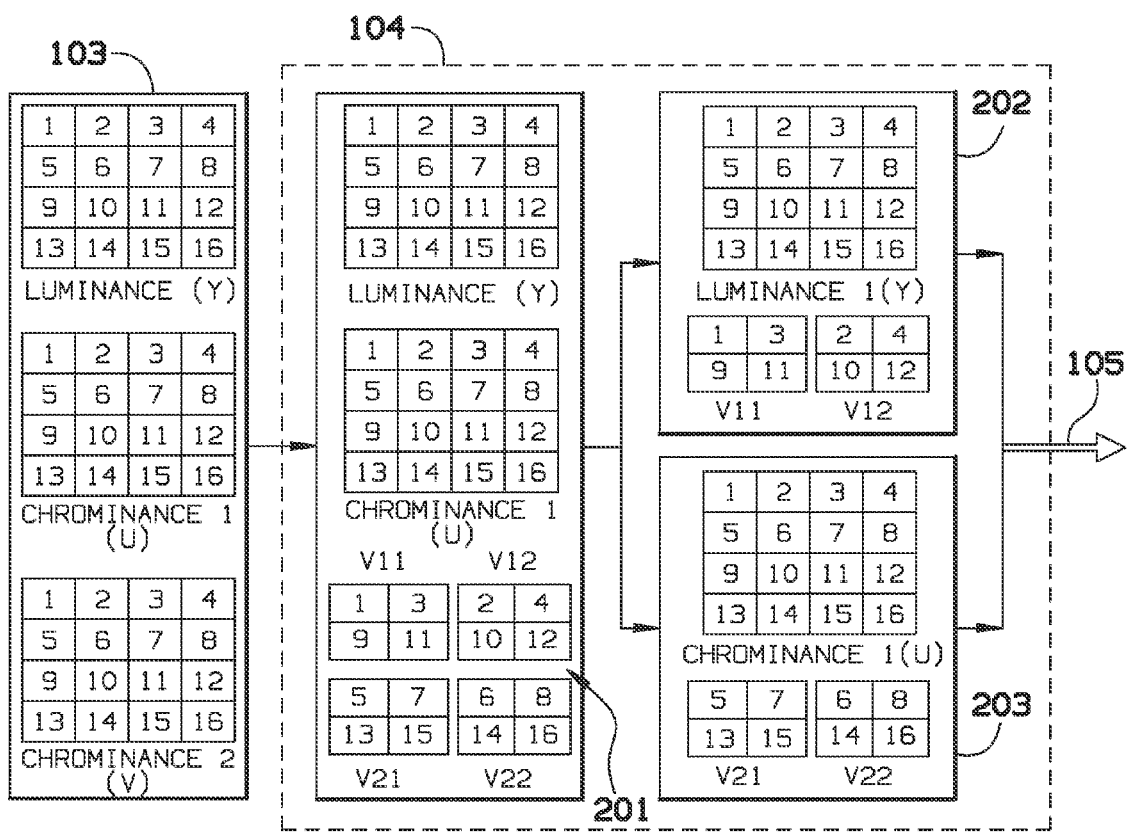
FIG. 2 is a block diagram of the splitting of YUV444 into two YUV420 format frames.

As best viewed in the format converter 104 converts the three YUV components in to two frames 202 and 203 with each of the frame having 1.5 times the resolution of each Y, U, V component. This conversion process is shown in FIG. 2.

One of the chrominance components (U or V), in this case, the V component frame (chrominance 2), is split in to 4 sub-frames 201 by sampling alternate pixels in each row and column.

By representing each of the Y, U and V components as a matrix of four columns and four rows of pixels and each of the U and V sub-frames as matrices of two columns and two rows of pixels the process can be explained as follows:

The first U sub-frame is formed from combining pixels represented by the first column first row, third column first row, first column third row and third column third row of the U component. The second U sub-frame is formed from combining pixels represented by the second column second row, second column fourth row, fourth column second row and fourth column fourth row of the U component. The first V sub-frame is formed from combining pixels represented by the first column first row, third column first row, first column third row and third column third row of the V component. The second V sub-frame is formed from combining pixels represented by the second column second row, second column fourth row, fourth column second row and fourth column fourth row of said V component.

Each U and V sub-frame now has one quarter of the total pixels in the original component frame 103 that is split up. Any two sub-frames are added to the luminance (Y) component frame 202 and the remaining two sub-frames are added to the remaining un-split chrominance (U or V) component frame 203.

The effect of this splitting is to produce two YUV420 frames 202 and 203 from a YUV444 frame 103. This splitting helps to use widely available video decoders to decode the information while still preserving the quality of the original image 103. The widely available video decoders typically use YUV420 format.

Figure 3:
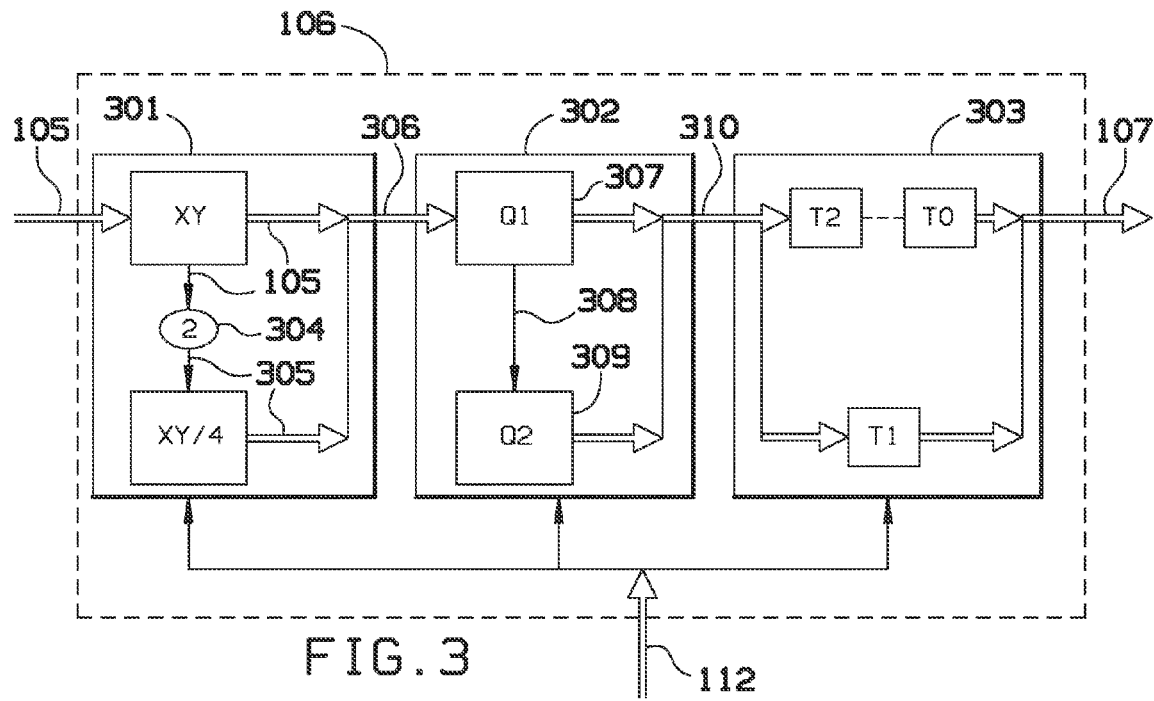
FIG. 3 is a block diagram of the scaling system of YUV420 formats.

The two YUV420 frames 202 and 203 are then passed according to 105 through a scaling process 106 that does temporal, quality and spatial scaling on the inputs. FIG. 3 shows the scaling process. The scaling process 106 receives input parameters 112 from encoder controller 111. Both the YUV420 frames undergo exactly the same process with the same set of parameters. This way they can have same quality after decoding at the decoder.

The two frames may initially undergo spatial scaling process 301 where the inputs frames 202 and 203 are scaled down using a down-sampling process 304 to the required frame size. In this scaling process 301 has the effect of shrinking an image of a frame and serves to reduce latency. The input frames 105 as well as the spatially scaled frames 305 are then sent as 306 to the quality scaling process 302. The frames 306 may further undergo one or more quality scaling processes to produce multiple frames at different qualities 307 and 309 as output at 310. Frames 310 may represent less pixels than present in frames 202 and 203. After quality scaling, frames 310 may then go through temporal scaling process 303 to obtain frames at different instances 107 but less frequent than the original video. Finally, frames with differing temporal, spatial and quality scaling according to scaling 301, 302 and 303 result. Each of the individual scaling processes of 301, 302, 303 may proceed sequentially or in parallel. Similarly, the spatial, quality and temporal scaling processes may occur in parallel or in any sequential order. While spatial scaling is required, quality and temporal scaling are optional based upon user experience and network conditions.

Figure 4:
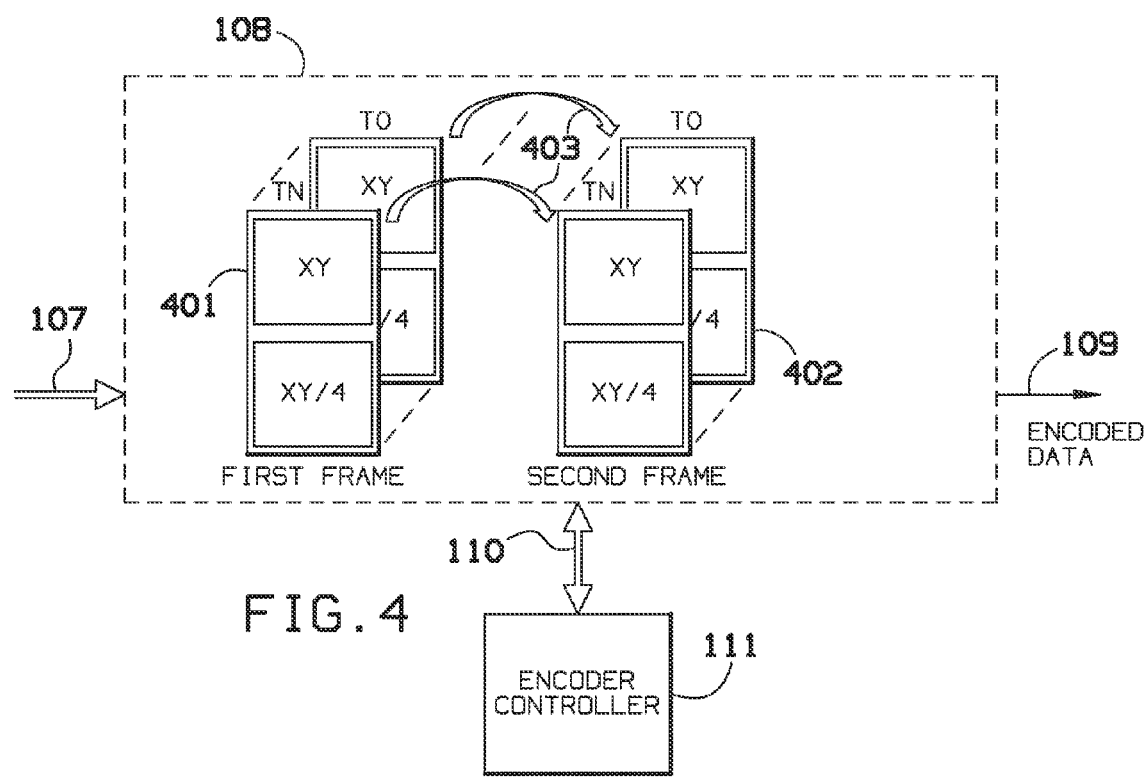
FIG. 4 is a diagram illustrating the use of encoding parameters of the first YUV420 format to the second YUV420 format.

The frames 107 obtained from the scaling process 106 then undergo encoding using video encoder 108. The video encoding process is controlled by the encoder controller 111. FIG. 4 shows the encoding process of two sets of frames. The first set of frames 401, chronically differentiated by TN and T0 layer designations, were originally obtained from frame 202 and processed by 106. Frames 401 include Y component. The second set of frames 402, again chronologically differentiated by TN and T0 layer designations, were originally obtained from frame 203 and processed by 106. Frames 402 include only U and V components. Initially the first set of frames 401, undergo the encoding process using parameters 110 such as motion vectors, quantization, etc.

These parameters 110 are also passed on to be used to encode the second set of frames 402 as indicated by 403. Parameters may be obtained from encoder controller 111 as a result of layer comparisons. While processing of frames 401 and 402 has been described as happening at different times, for example, sequentially, in some embodiments both can be carried out by encoder controller 111 in parallel.

The processing of the frames 401 and 402 in some embodiments can be carried out by the standard Three-dimensional (3D) video encoders by treating the both the frames as stereoscopic or multi-view frames.

In some embodiments, processes 106 and 108 can be combined to produce the encoded data 109 directly from the two YUV420 frames 202 and 203 at 105. Encoder controller 111 may be provided in the form of an integrated application, an algorithm to be performed by an electronic computing device, an electronic computing device or a combination of these. Both the scaling and encoding processes are managed by encoder controller 111 providing parameters to encoder 108 and scaler 106. Parameters are selected to achieve low latency, low bandwidth, better user experience, error resilience, etc according to the needs of the remote presentation participants.

After encoding 108, encoded data 109 is then sent to transmission protocols as a payload for the receiver. Encoded data 109 is now ready for transmission to a remote location within a wide area network for use in a remote presentation. The transmission media may drop some of the encoded data but the decoder can still decode and produce acceptable image.

Figure 5:
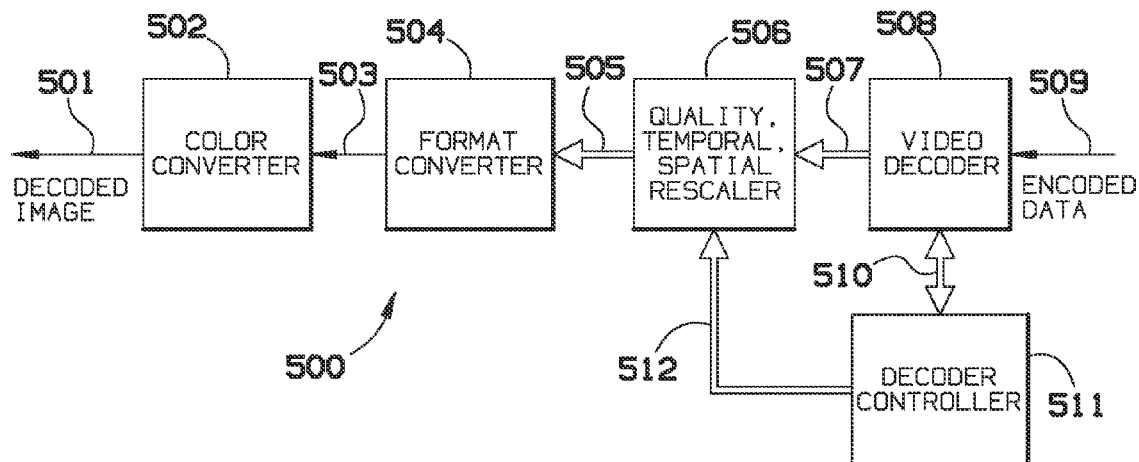
FIG. 5 is a block diagram of the decoder system of the present invention.

Upon receipt by a remote transmission receiver, encoded data 109 becomes the input 509 for the decoding process at the remote location as shown in FIG. 5. Encoded data 109 includes information about decoding parameters according to encoding parameters such as 403. This may be provided in the form of, for example, metadata and/or codec information. This information is usable by the decoder controller 511.

Any standard video decoder 508 decodes the encoded data in a process similar to the reverse of that depicted in FIG. 4 and thereby produces decoded frames 507 based on the parameters 510 set by the decoder controller according to the information about the parameters 110 and 112. The decoded frames 507 are then sent through the rescaler 506 to produce images with proper scaling for the display device of a remote presentation recipient.

Figure 6:
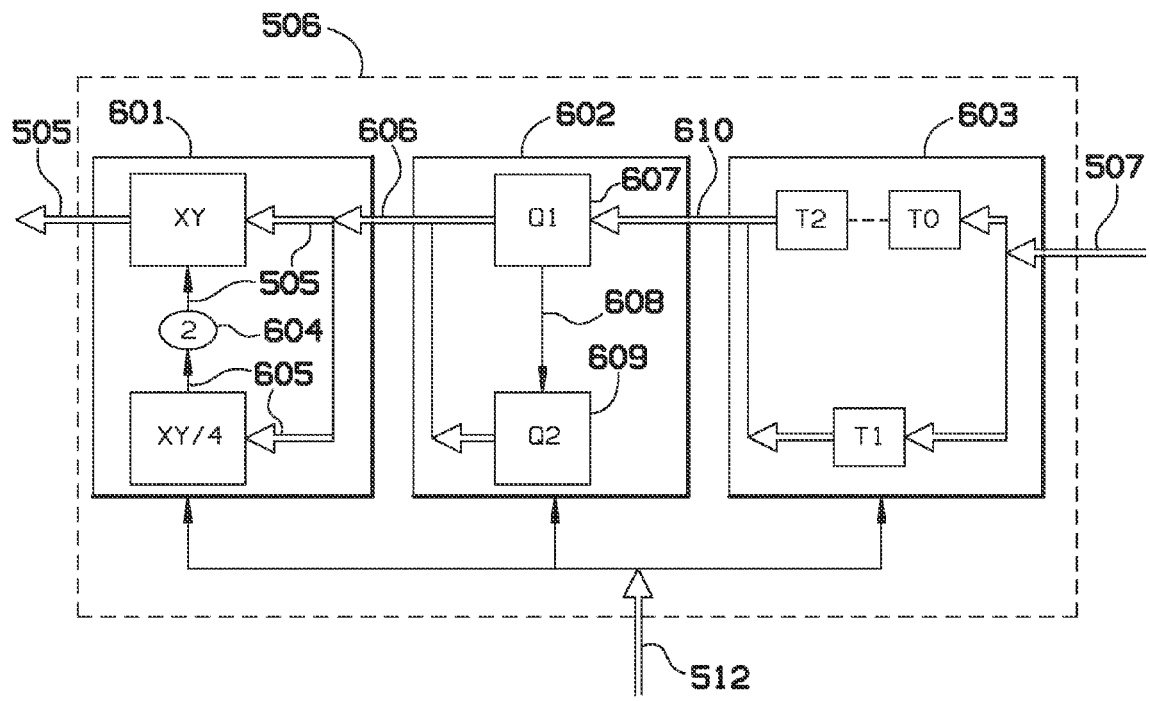
FIG. 6 is a block diagram of the rescaling system for the YUV420 formats.

FIG. 6 shows the rescaling process 506. The rescaling process may initially accomplish temporal rescaling 603 based on the controller parameters 512. The output 610 of the temporal rescaler is then passed through the quality rescaler 602 where the rescaled quality process is carried to produce an output with quality 606. The quality rescaler can be a simple quality layer selector or process to enhance quality. The output 606 may then be passed to spatial rescaling process 601 to obtain a spatially scaled frame 505 of desired resolution according to the needs of the remote presentation recipient. The spatial rescaling process may involve an upscaler 604 which may upscale a low resolution frame 605 in to a frame 505 of required resolution.

In some embodiments, processes 506 and 508 can be combined to produce the decoded data 505 directly from the encoded data 509. Decoder controller 511 may be provided in the form of an integrated application, an algorithm to be performed by an electronic computing device, an electronic computing device or a combination of these. Both the resealing and decoding processes are managed by encoder controller 511 providing parameters to decoder 508 and rescaler 506.

Figure 7:
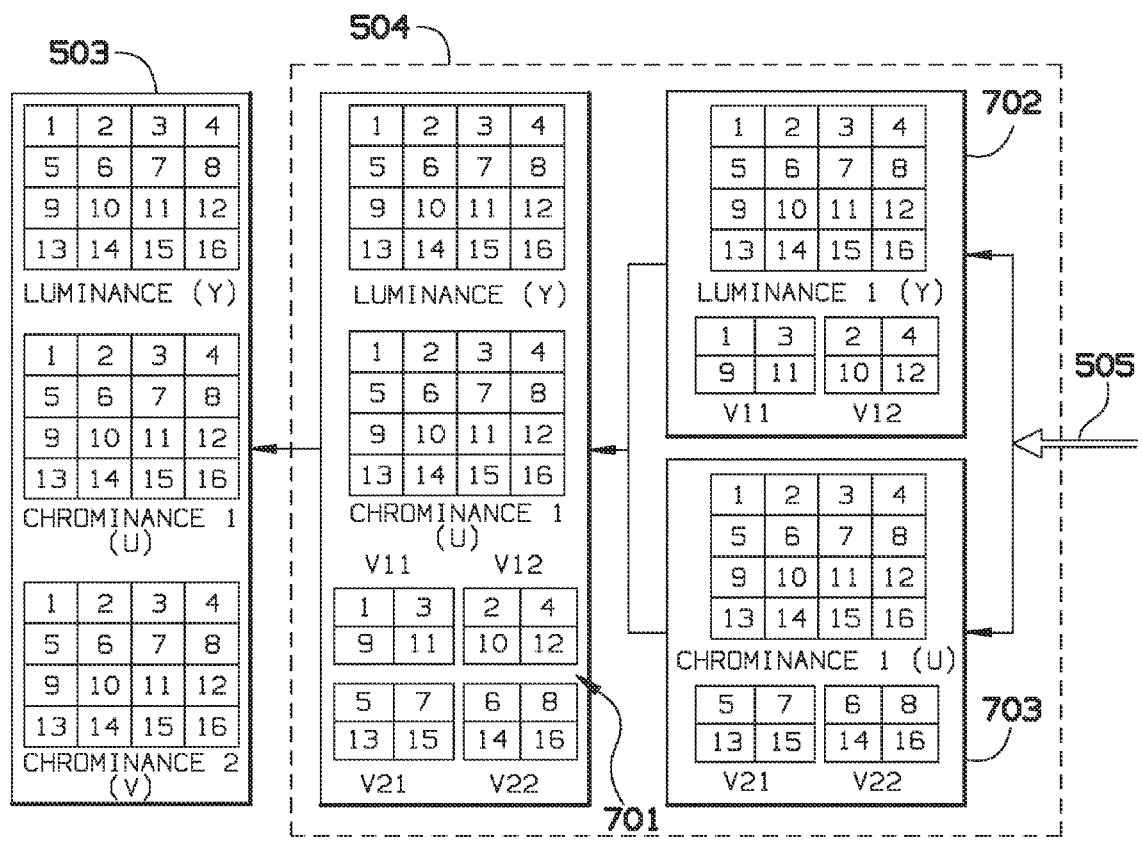
FIG. 7 is a block diagram of the combination of first and second YUV420 format frames into YUV444 format.

The output 505 consists of YUV420 frames 702 and 703. Frames 702 and 703 are combined in the format converter 504 to produce a single YUV444 frame 503. FIG. 7 shows such operation of format converter 504. The chrominance components of two YUV420 frames 702,703 are collected and then placed with the Y component of one of the YUV420 format frames in frame 701 to produce the YUV444 frame 503. The process of combining the chrominance components of the two decoded YUV420 frames is preferably the reverse process of format converter 104. The decoder controller 511 may control the output 501 to get the correct YUV420 frames to be combined or consecutive even and odd pair of YUV420 output 505 can be combined using frame converter 504.

The YUV444 output 503 is then converted in to a RGB image 501 using color converter 502. The color conversion process may be a generally available process of converting YUV444 frame in to RGB image. The decoded image 501 is then sent for display or storage.

While desktop virtualization in remote display sessions is the preferred application of the present invention, it may also facilitate online gaming and video conferencing and may be used with thin clients, set-top boxes or tablet devices.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

I claim:

1. A method for encoding and decoding a wide-area network based remote presentation session comprising steps of:
obtaining an RGB display image;
converting the RGB image into a YUV 444 frame;
converting the YUV444 frame into first and second YUV420 frames, wherein:
the first YUV420 frame comprises, a first half of a first chrominance component of the YUV444 frame and a luminance component of the YUV444 frame, and
the second YUV420 frame comprises a second half of the first chrominance component of the YUV444 frame and a second chrominance component of the YUV444 frame;
spatially scaling the first YUV420 frame using spatial scaling parameters;

spatially scaling the second YUV420 frame using spatial scaling parameters;

encoding the first frame using a video encoder and encoding parameters;

encoding the second frame using the encoding parameters;

sending the encoded first and second frames to a receiver;

decoding the first and second frames using a standard video decoder;

combining the first and second YUV420 frames into a second YUV444 frame; and converting the second YUV444 frame into an RGB frame.

2. The method for encoding and decoding as set forth in claim 1 and further comprising the steps of:

scaling the first YUV420 frame for quality using quality scaling parameters;

scaling the second YUV420 frame for quality using the quality scaling parameters.

3. The method for encoding and decoding as set forth in claim 1 and further comprising the steps of:

temporally scaling the first YUV420 frame using temporal scaling parameters;

temporally scaling the second YUV420 frame using the temporal scaling parameters.

4. The method for encoding and decoding as set forth in claim 1, and further comprising:

conducting said scaling steps in parallel.

5. The method for encoding and decoding as set forth in claim 1, wherein the step of combining the first and second YUV420 frames into a second YUV444 frame further comprises:

combining the first half of the first chrominance component in the first YUV420 frame with the second half of the first chrominance component in the second YUV420 frame.

6. A method for preparing a YUV444 frame for transmission via wide-area networks, comprising the steps of:

converting a YUV444 frame having Y, U and V components into two YUV420 frames by:

dividing at least the U component or the V component of the YUV444 frame into sub-frames of the U component or the V component;

combining at least one of the sub-frames of the U component or the V component with the Y component to create a first YUV420 frame; and combining a remaining number of the sub-frames of the U component or the V component with the Y component to create a second YUV420 frame.

7. The method of claim 6, wherein: each of said Y, U and V components may be represented as a matrix of four columns and four rows of pixels, and wherein each of the sub-frames of the U and V components may be represented as matrices of two columns and two rows of pixels;

the at least one of the sub-frames of the U component or the V component of the first YUV420 frame is formed from combining pixels represented by the first row-first column, first row-third column, third row-first column and third row-third column of the U component or the V component; and the remaining number of the sub-frames of the U component or the V component of the second YUV420 frame is formed from combining pixels represented by the second row-second column, fourth row-second column, second row-fourth column and fourth-row fourth column of the U component or the V component.

8. The method for preparing a YUV444 frame as set forth in claim 6 wherein:

each of the sub-frames of the U component or the V component are one quarter the size of the U component or the V component.

9. The method for preparing a YUV444 frame as set forth in claim 6 and further comprising the steps of: spatially scaling each of the YUV420 frames to reduce latency for encoding.

10. The method for preparing a YUV444 frame as set forth in claim 6 and further comprising the steps of: temporally scaling each of the two YUV420 frames to reduce bandwidth.

11. The method for preparing a YUV444 frame as set forth in claim 6 and further comprising the steps of: scaling each of the YUV420 frames for quality to reduce bandwidth.

12. The method for preparing a YUV444 frame as set forth in claim 6 and further comprising the steps of: encoding both the YUV420 frames as stereoscopic or multi-view frames for 3D encoding.

13. The method for preparing a YUV444 frame as set forth in claim 6 and further comprising the steps of: establishing encoding parameters based upon motion estimation and prediction.

14. The method for preparing a YUV444 frame as set forth in claim 13 and further comprising the steps of: using the encoding parameters to encode both of the two YUV420 frames.

15. A method for use with remote presentation, comprising the steps of:

providing first and second YUV 420 frames, wherein said first YUV 420 frame comprises a luminance component and a first portion of a first chrominance component from a previously split YUV444 frame, and wherein said second YUV420 frame comprises a second chrominance component and a second portion of said first chrominance component from a previously split YUV444 frame;

combining the first portion of said first chrominance component in the first YUV420 frame with the second portion of said first chrominance component in the second YUV420 frame into a single first chrominance component; and combining the luminance component of the first YUV420 fame with the second chrominance component of the second YUV420 frame and the single first chrominance component to form a single YUV444 frame.

* * * * *